(12) United States Patent
Starkovich

(10) Patent No.: US 10,421,847 B1
(45) Date of Patent: Sep. 24, 2019

(54) NANOPOROUS WICK AND OPEN-CELLULAR POROUS STRUCTURES AND METHOD OF MANUFACTURE

(71) Applicant: Northrop Grumman Systems Corporation, Falls Church, VA (US)

(72) Inventor: John A. Starkovich, Redondo Beach, CA (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 0 days.

(21) Appl. No.: 16/139,249

(22) Filed: Sep. 24, 2018

(51) Int. Cl.
| | | |
|---|---|---|
| *C08J 9/00* | (2006.01) | |
| *C08J 9/28* | (2006.01) | |
| *C08J 3/09* | (2006.01) | |
| *B82Y 40/00* | (2011.01) | |
| *F28D 15/04* | (2006.01) | |

(52) U.S. Cl.
CPC .......... *C08J 9/28* (2013.01); *C08J 3/092* (2013.01); *C08J 3/093* (2013.01); *B82Y 40/00* (2013.01); *C08J 2201/0482* (2013.01); *C08J 2201/0522* (2013.01); *C08J 2205/026* (2013.01); *C08J 2205/042* (2013.01); *C08J 2205/05* (2013.01); *C08J 2323/06* (2013.01); *C08J 2323/12* (2013.01); *C08J 2323/20* (2013.01); *F28D 15/046* (2013.01)

(58) Field of Classification Search
CPC ....................................................... C08J 9/28
See application file for complete search history.

(56) References Cited

U.S. PATENT DOCUMENTS

| | | | | |
|---|---|---|---|---|
| 5,066,684 A | * | 11/1991 | LeMay ............... | C08J 9/122 521/130 |
| 5,376,445 A | * | 12/1994 | Fortuin ............. | B01D 67/0009 428/339 |
| 6,620,356 B1 | * | 9/2003 | Wong ................. | A61L 27/56 210/490 |
| 2003/0168764 A1 | * | 9/2003 | Nishida ............. | B01D 67/003 264/41 |
| 2007/0012617 A1 | * | 1/2007 | Suzuki .............. | B01D 67/002 210/500.27 |
| 2014/0350134 A1 | * | 11/2014 | Rodman ............. | C08J 9/28 521/64 |
| 2017/0240424 A1 | * | 8/2017 | Roberts ............. | C01B 32/05 |

\* cited by examiner

*Primary Examiner* — Irina Krylova
(74) *Attorney, Agent, or Firm* — McCracken & Gillen LLC

(57) ABSTRACT

A nanoporous open-cell foam or wick structure and method for production are disclosed. The nanoporous foam or wick structures are produced from, for example, thermoplastic or thermoset polymer gels in which a gelation solvent is removed so as to preserve an expanded monolithic gel structure consisting of intertwined and or chemically cross-linked polymer molecular fibrils. The nanoporous foam or wick may encompass a stand-alone structure, or be incorporated in to microporous open cell foams or wick materials converting them in to nanoporous cellular materials having a bipore structure. Such produced nanoporous polymer materials have unique properties that may be exploited for making high performance capillary pump loop or heat pipe thermal management systems, low-boiloff slosh-less cryogen storage vessels and superior insulation materials for systems operating under ambient and elevated pressure conditions.

4 Claims, 7 Drawing Sheets

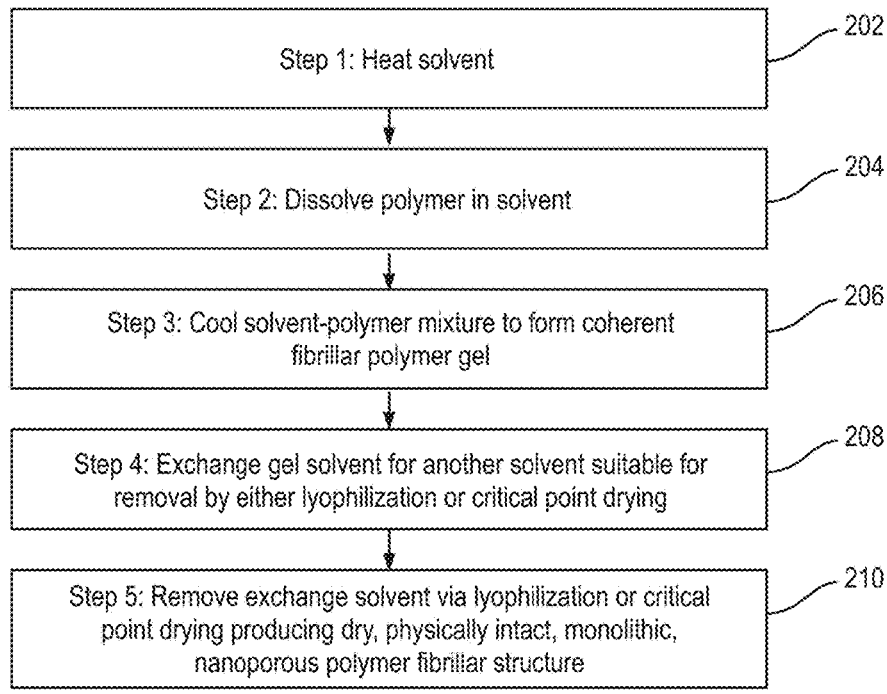
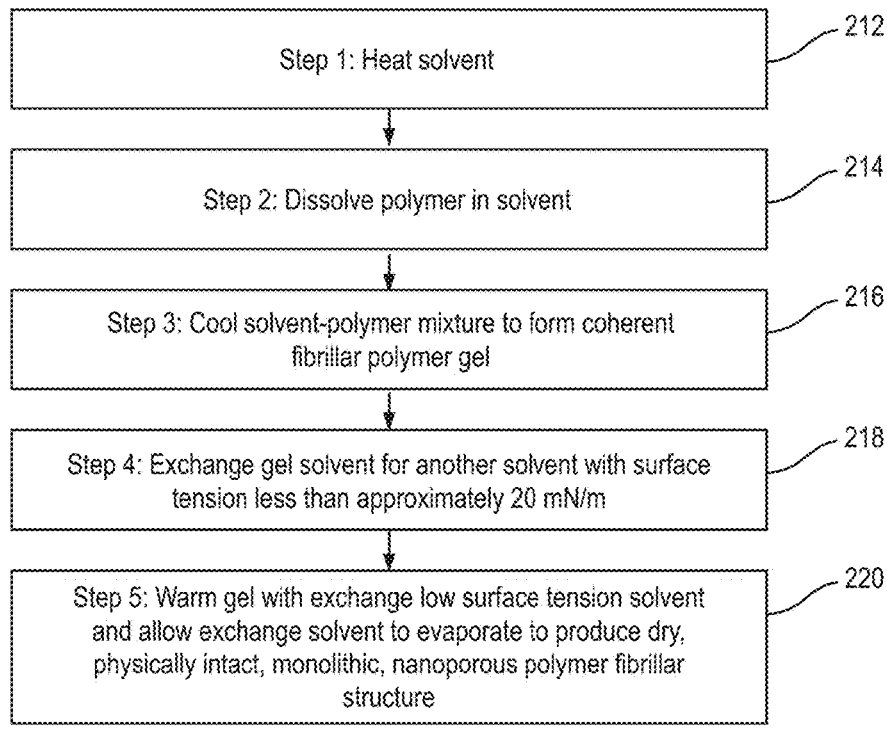

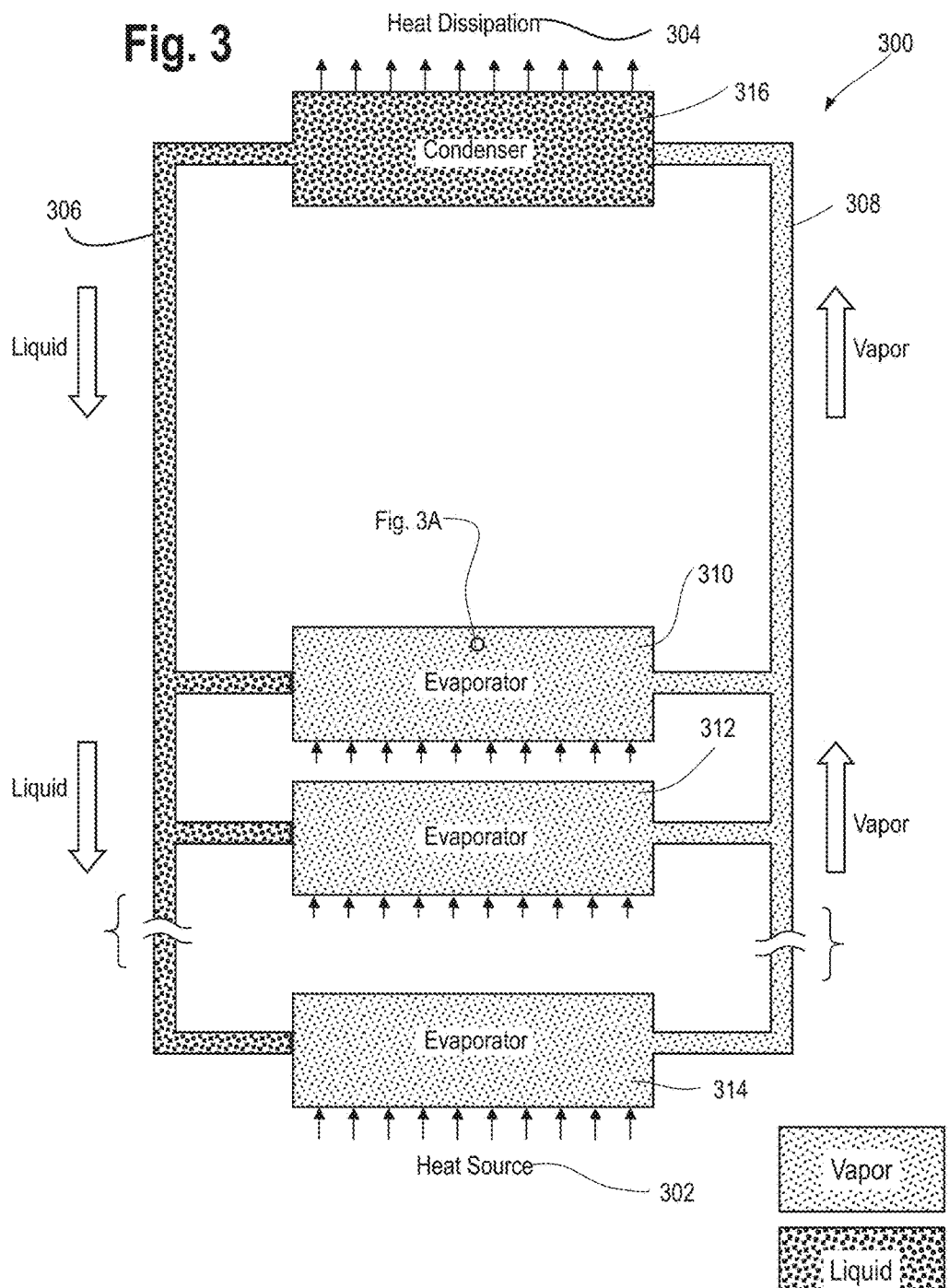
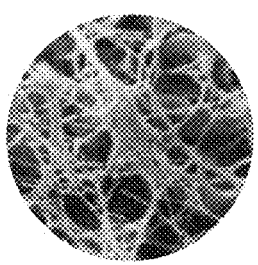

402

404

406

408

NANOPOROUS WICK AND OPEN-CELLULAR POROUS STRUCTURES AND METHOD OF MANUFACTURE

BACKGROUND

The invention relates generally to porous materials and more particularly to nanoporous fibrillar open-cellular polymer structures.

Nanoporous materials generally include a framework supporting a random structure of voids, or pores. They have many uses, for example, thermal insulation, liquid storage media and wick materials for capillary pump loop and heat pipe thermal management systems.

Capillary pump loop (CPL) and heat pipe (HP) thermal management systems use capillary action to remove heat from a source. For particular aerospace applications, CPLs and HPs need to operate over a long distance and against gravity. They have many applications, for example, as reliable cooling systems for high power density and high heat load systems such as compact directed energy weapons (DEW), air- and spacecraft avionics, radar, communications, and flight control electronics operating in high g-acceleration environments or at remote locations from the primary cooling system. In general, a CPL or HP includes a wicking structure that uses liquid coolant to move heat between an evaporator and a condenser. The ability to move coolant over long distances and against gravitational forces depends critically on the permeability and pore size properties of the wick. The highest performing wick materials are theorized to have interconnected open porosities of 90% or more and pore cell sizes less than 100 nanometers.

There is currently no satisfactory way of making high performance wick materials with both nanometer dimension pores and high porosity/permeability. Current state-of-art CPL/HP wicks have micrometer and larger size pores which significantly limit the capillary liquid pumping pressure and thus condenser-evaporator separation and the g-acceleration factor they can effectively operate under. Current wick manufacturing technology melts or fuses polymer and/or metal powders to produce monolithic tube or slab wicks. These melt/sintered wicks have pore diameters in the range of ~5,000 to 90,000 nm (~5 to 90 um). In addition, the pores are not regularly or uniformly distributed along the wick length. Further, the melted/sintered wicks have low porosities of the order of only 40-50%. An alternative wick structure used in CPL/HP systems is tubes with axial grooves/channels. While such wicks have higher and more uniform porosity, they have much larger capillary pores and are less able to develop high working capillary pressures.

SUMMARY

Representative embodiments encompass a nanoporous wick structure derived from, for example, thermoplastic or thermoset polymer gels in which a gelation solvent is carefully removed so as to preserve an expanded monolithic gel structure consisting of intertwined and/or crosslinked polymer molecular fibrils.

DESCRIPTION OF THE DRAWINGS

Features of example implementations of the invention will become apparent from the description, the claims, and the accompanying drawings in which:

FIG. 2A, 2B are flowcharts illustrating two methods of forming a nanoporous wick or foam structure.

FIGS. 3 and 3A depict a capillary pump loop or heat pipe.

DETAILED DESCRIPTION

Reference will now be made in detail to one or more embodiments of the invention. While the invention will be described with respect to these embodiments, it should be understood that the invention is not limited to any particular embodiment. On the contrary, the invention includes alternatives, modifications, and equivalents as may come within the spirit and scope of the appended claims. Furthermore, in the following description, numerous specific details are set forth to provide a thorough understanding of the invention. The invention may be practiced without some or all of these specific details. In other instances, well-known structures and principles of operation have not been described in detail to avoid obscuring the invention.

Figure 1:
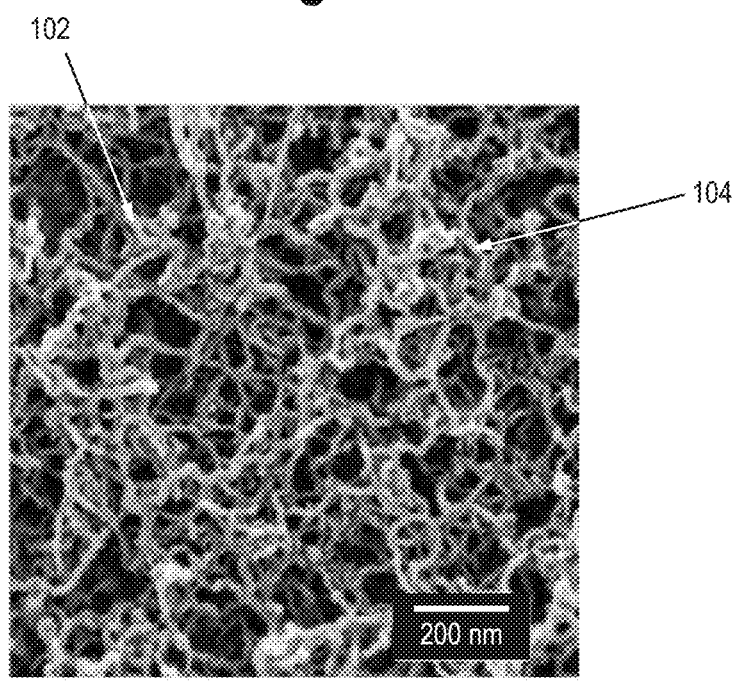
FIG. 1 depicts a structural view of a nanoporous fibrillar material.

A representative nanoporous gel structure is shown in FIG. 1. In an embodiment, nanoporous foam or cellular materials are derived from, for example, thermoplastic or thermoset polymer gels in which the gelation solvent is carefully removed so as to preserve the expanded monolithic gel structure consisting of intertwined and crosslinked polymer molecular fibrils indicated, for example, at 102 and 104. The nanoporous gel structure of FIG. 1 is magnified, the scale of 200 nm is shown in the lower right corner.

A method of making a nanoporous open-cell structure as shown in FIG. 1 is discussed with reference to FIGS. 2A and 2B. In FIG. 2A the aerogel structures are derived from polymer gels in which the gelation solvent is exchanged/removed through lyophilization or critical fluid processing (zero-surface tension drying methods) to produce a low density, free-standing, open pore body of 90-98% porosity with sub-100 nm pores. In a first step 202, a solvent is heated. In an embodiment, the solvent is an aromatic hydrocarbon such as toluene, xylene, benzene or mixtures thereof; an organochlorine compound such as trichloroethane, trichlorobenzene or mixtures thereof; or aliphatic and cyclic hydrocarbons such as polybutenes, decalin or mixtures thereof. Next, in step 204, a polymer powder is dissolved in the solvent. In an embodiment, the polymer is polyethylene however, other polymers such as polypropylene, polybutylene or mixtures thereof may be used.

The heated solvent-polymer solution is cooled in step 206 so that the polymer forms fibrils or thread-like particles which intertwine and form a soft coherent body. The coherent body has a low yield stress compared with normal solids and resists movement and flow as a free liquid. The yield stress of the gel depends on the particular polymer-solvent combination, the polymer molecular weight and concentration and can vary from 10 to over 5,000 Pa. The polymer fibrils may exist in a physically intertwined aggregate structure or as chemically covalently crosslinked molecules. In step 208, the solvent is exchanged for one with a critcal point less than approximately 100° C. or a solvent with a freezing point less than approximately 50° C. and sublimation vapor pressure greater than 100 Pa. Finally, in step 210, the replaced solvent is carefully removed by critical point drying or lyophilization leaving the nanoporous polymer gel structure intact in a dry state. Examples of solvents used in step 208 include liquid carbon dioxide, methane, ethane, propane, ethylene or mixtures thereof when the solvent is removed by critical point drying although any solvent with a critical point less than approximately 100° C. may be used. Examples of solvents used in step 208 also include menthol, camphene, tert-butanol or mixtures thereof when the solvent is removed through lyophilization although any solvent with a freezing point less than approximately 50° C. and sublimation vapor pressure greater than 100 Pa may be used.

In FIG. 2B the first three steps 212, 214 and 216 for producing the aerogel structure are the same as the process shown in FIG. 2A, only steps 218 and 220 are altered in this production method to permit normal evaporative drying of the gel structure. In fourth step 218, the solvent used to dissolve the polymer and form a gel is exchanged with a solvent having a surface tension less than approximately 20 mN/m and more preferably less than 15 mN/m. Examples of low surface tension solvents include but are not limited to: fluroalkanes and alkyl compounds such as perfluoro-hexane, -heptane, -octane, hexafluorobenzene or mixtures thereof. Further examples of low surface tension solvents include certain dialkyl ethers such as di- methyl, ethyl, propyl, isopropyl, butyl ethers or mixtures thereof. These exchange solvents also exhibit appreciable vapor pressures below 100° C. aiding their evaporation and removal from polymer gels. In fifth step 220 these low surface tension exchange solvents are evaporated to produce intact nanoporous monolthic polymer gel structures in a dry state.

A nanoporous open-cell foam as describe above has a variety of applications. In an embodiment, a nanoporous foam is used as a wick structure in a capillary pumped loop (CPL) or heat pipe (HP). A representative CPL/HP 300 is shown in FIG. 3 to illustrate embodiments of the invention. It is a two-phase heat transfer device that moves heat from heat source 302 to heat sink 304. Conduits 306 and 308 form a loop between evaporators 310, 312 and 314, adjacent to heat source 302, and condenser 316, adjacent to heat sink 304. HP/CPL 300 is filled with a coolant liquid such as ammonia or Freon®, for example. Heat source 302 causes the liquid in evaporators 310, 312 and 314 to vaporize and travel to condenser 316 through conduit 308. In condenser 316, heat sink 304 causes the vapor to cool and condense back into liquid which is transferred back to evaporators 310, 312 and 314 through conduit 306. HP/CPL 300 uses capillary action to move vapor and liquid through the system. Capillary action relies on intermolecular forces to cause liquid to flow in narrow spaces without assistance.

To take advantage of capillary action, HP/CPL 300 uses a nanoporous wick in evaporators 310, 312 and 314 as shown in FIG. 3A. Performance of CPLs and HPs are critically dependent on the capillary wick used for internal transport of liquid phase coolant between condenser and evaporator. The capillary wick controls coolant flow rate and thus governs system heat load capability and its maximum operating g-force and separation distance between evaporator and condenser. Nanoporous materials derived from polymer gels with pore diameters less than 100 nanometers greatly increase CPL/HP capillary pressures and thereby increase limits of condenser-evaporator separation and/or height as well as their g-acceleration environmental limit.

Figure 4A:
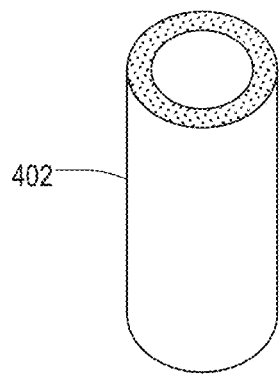
FIGS. 4A-4D depict a variety of nanoporous wick structures.
Figure 4B:
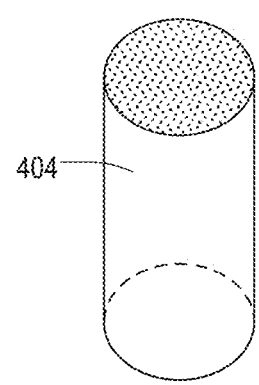
Figure 4C:
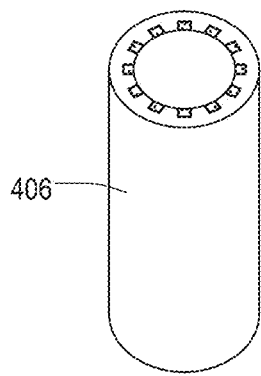
Figure 4D:
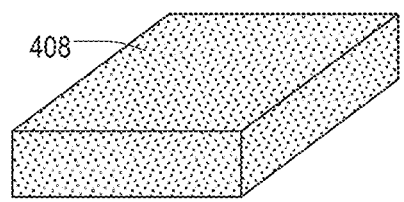

In an embodiment, nanometer-dimension, intertwined fibrillar or tendrillar gel structures and particular chemical production methods are used to make aerogel wicks that enable extremely high performance CPL and HP systems. These aerogel structures may be fabricated in a variety forms and shapes as illustrated in FIGS. 4A-4D and used in different HP/CPL designs. For example, a wick structure may be formed as an annular tube 402 shown in FIG. 4A, a solid cylinder 404 as shown in FIG. 4B or a slab 408 as shown in FIG.4D having a variety of dimensions. In addition, the nanoporous open-cell foam may be combined with micropore wicks as shown at 406 in FIG. 4C and discussed in more detail below.

Figure 5A:
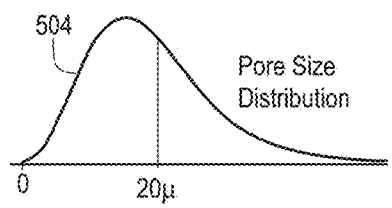
FIGS. 5A and 5C are graphs depicting pore size distributions associated with the wicks of FIGS. 5B and 5D.
Figure 5C:
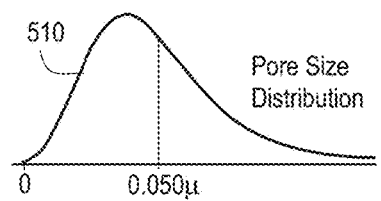
Figure 5B:
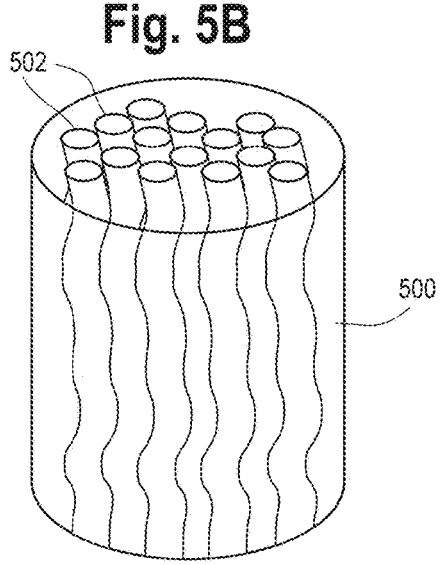
FIGS. 5B, 5D and 5E depict a microporous and a combined micro- and nanoporous wick.
Figure 5D:
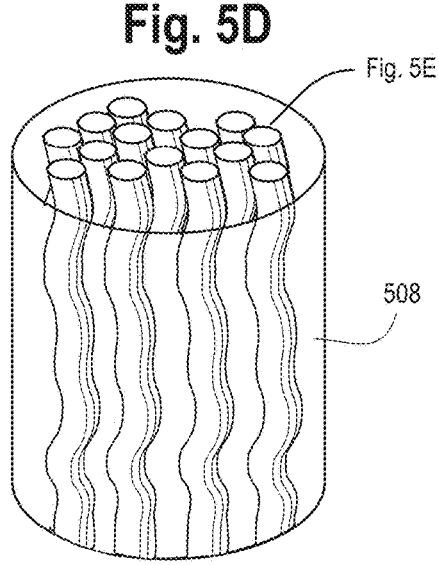
Figure 5E:
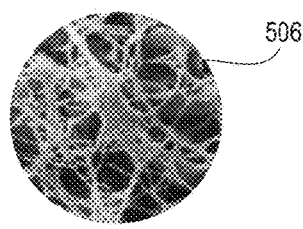

Another embodiment and advantage of the invention is that the nanoporous gel structures may be incorporated or deposited in microporous bodies to reduce or convert their effective pore cell size from the micrometer scale down in to the nanoscale region. Examples of pore cell size reduction or conversion are shown in more detail in version of wick structures illustrated in FIG. 4A-4D, an example of which is shown in FIGS. 5A-5E. Chemically crosslinked and/or physically intertwined aerogel structures may be used to convert current microporous technology open pore foams and wicks into bi-pore structures. In this embodiment, the coarser micropore foam or wick material serves as a scaffolding or host medium in which aerogel is grown or deposited. This effectively converts the micropore foam or wick into a nanoporous structure. A micropore polyethelene wick 500 of FIG. 5B has a plurality of pores 502 resulting in approximately 40% porosity. Although pores 502 are shown as tubes extending along the length of wick 500, they make take a variety of forms, including grooves around the circumference as shown at 406 in FIG. 4C or a solid cylinder of microporous foam. A graph showing a distribution of pore sizes relative to 20 microns is shown at 504 in FIG. 5A. A nanoporous open-cell foam 506 of FIG. 5E may be added to micropore wick 508 of FIG. 5D, resulting in a graph 510 in FIG. 5C showing a distribution of pore sizes relative to 0.050 microns (50 nm). Although a specific micropore wick is shown in FIGS. 5A-5E, it should be understood that this method may be applied to any micropore wick or foam.

Figure 6:
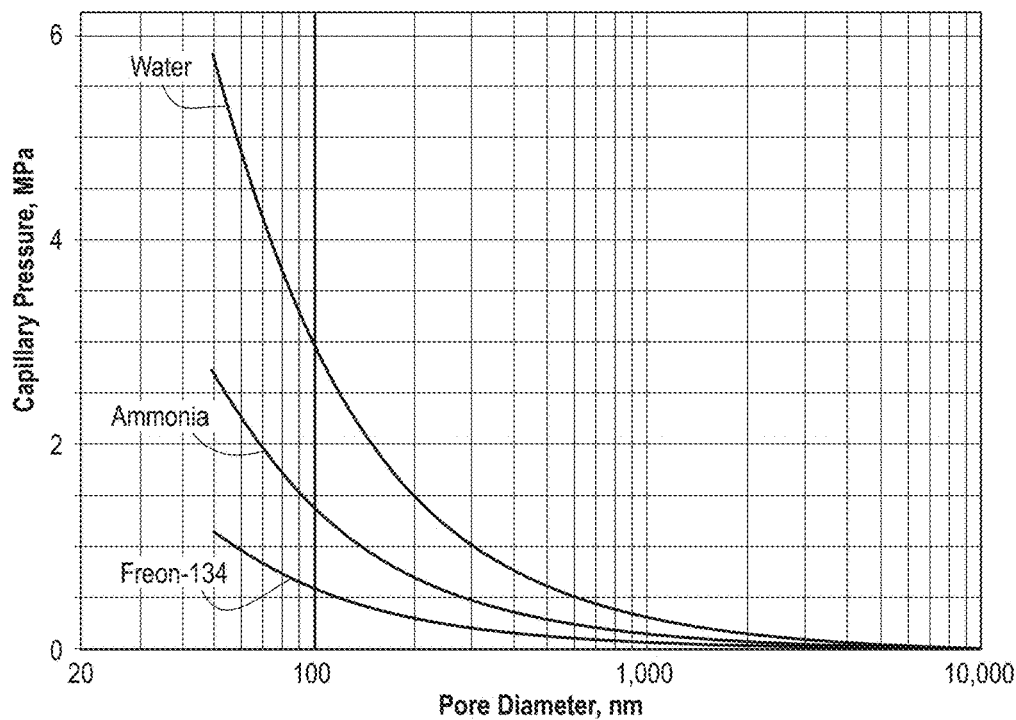
FIG. 6 is a graph showing capillary pressures for wicks with a range of pore dimensions and different coolant fluids.

The range of capillary pressures that can be developed with nanoporous wicks is shown in FIG. 6 and compared with pressures generated by wicks with micrometer (μm) sized pores. Pore diameter in nanometers (nm) is plotted vs. capillary pressure in megapascals (MPa). Nanoporous wicks, those having pore sizes of 100 nm or less, exhibit capillary pressures for water, ammonia and Freon-134 that are much higher than the capillary pressures available for wicks with micrometer-sized pores greater than 1,000 nm (1 μm).

Nanoporous wicks can be made from a variety of thermally and chemically stable polymer materials enabling them to be used with a wide selection of polar and non-polar liquid coolants ranging from Freon to water. A wide variety of polymers from low temperature capability polyethylene (PE) to much higher service temperature polymers like polyimides that are compatible with wide choice of coolant fluids may be used.

Figure 7:
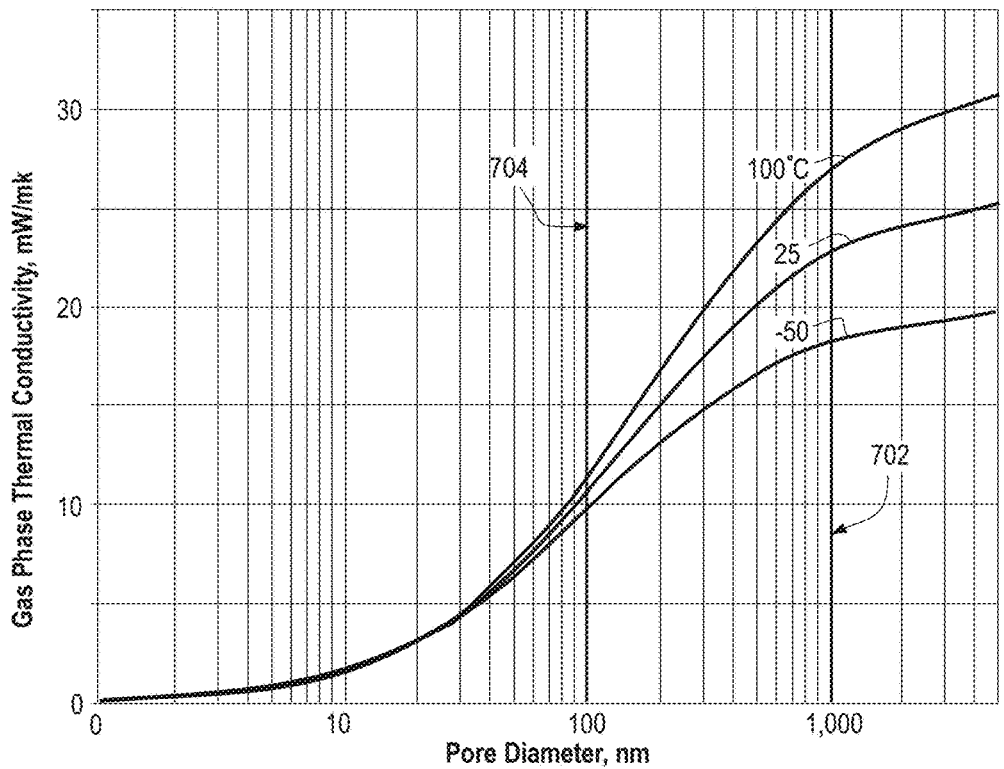
FIG. 7 is a graph showing superior insulation properties of nanoporous cellular solid.

In a further embodiment, nanoporous open-cell foam as described above is used as thermal insulation. FIG. 7 is a graph showing a plot of gas phase thermal conductivity in mW/mK (milliWatts per milliKelvin) vs. pore diameter in nanometers. Microporous materials generally have pore diameters of 1,000 nm and higher, in other words, materials to the right of line 702 in the graph. Nanoporous materials such as those described above generally have pore diameters in the range of 100 nm or less, shown to the left of line 704 in the graph. The performance advantage of nanoporous insulating foams over microporous foams is also achieved over a wide operating temperature range as illustrated by the −50, 25 and 100° C. temperature curves in FIG. 7.

Figure 8:
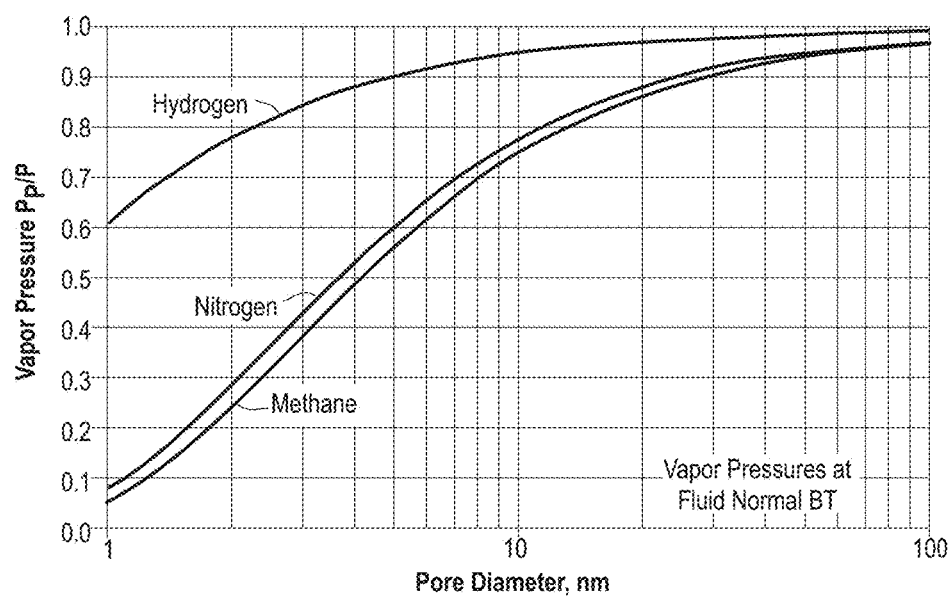
FIG. 8 is a graph illustrating reduced vapor pressure of various cryogenic liquids contained in nanoporous foam structure.

In a further embodiment, nanoporous open-cell foams may be used to improve cryogen storage by reducing boiloff and thereby extending their storage time. Cryogens refer to the liquid form of gases that may be liquefied at or below −150° C. (123° K). Boil-off is a problem when storing cryogens due to heat leak or transfer from the warmer environment outside of a container used to store the cryogen. Another problem associated with storing cryogens is slosh control, which is typically addressed by including screens and baffles within the storage container. In an embodiment, filling a cryogen storage container with nanoporous open-cell foam addresses both of these problems. The nanoporous foam reduces the vapor pressure of the liquid, thus raising the effective energy required to boil a quantity or mass of the cryogen. The structure of the nanoporous foam also provides slosh control while still allowing a large quantity of liquid to be stored in the container. FIG. 8 shows a graph depicting the cryogen vapor pressure reductions when nanoporous media is added to a storage container. Vapor pressure in $P_p/P_b$ (dimensionless ratio of vapor pressure of cryogen in nanopore foam to vapor pressure of the cryogen at its normal boiling temperature) is plotted vs. pore diameter in nm for hydrogen, nitrogen and methane. As may be seen from FIG. 8 for foam with a 10 nm pore size, the vapor pressure of hydrogen is reduced by approximately 5% ($P_p/P_b$ ratio=0.95) while the vapor pressures of liquid nitrogen and methane are reduced between 22 to 25%. For smaller pore sizes the reductions are much larger.

The steps or operations described herein are just for example. There may be many variations to these steps or operations without departing from the spirit of the invention. Although example implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

What is claimed is:

1. A method of forming a nanoporous wick, comprising the steps of:
   heating a first solvent, wherein the first solvent is selected from the group consisting of toluene, xylene, benzene, trichloroethane, trichlorobenzene, decalin and mixtures thereof;
   dissolving a polymer in the heated solvent, wherein the polymer is selected from the group consisting of polyethylene, polypropylene, and polybutylene;
   cooling the solvent-polymer mix to form a polymer fibril structure;
   exchanging the first solvent for a second solvent, wherein the second solvent has a lower freezing temperature than the first solvent, and wherein the second solvent is selected from the group consisting of menthol, camphene and tert-butanol; and
   removing the second solvent from the polymer fibril structure, wherein the removing step comprises lyophilization, thereby forming a nanoporous wick having a pore size of less than 50 nanometers (nm) and a porosity between 90% and 98%, and the nanoporous wick suitable for performing one or more of containing and transferring one or more of water, ammonia, Freon, hydrogen, nitrogen, and methane.

2. The method of claim 1 wherein the polymer is a polymer powder.

3. A method of forming a nanoporous wick, comprising the steps of:
   heating a first solvent, wherein the first solvent is selected from the group consisting of toluene, xylene, benzene, trichloroethane, trichlorobenzene, decalin and mixtures thereof;
   dissolving a polymer in the heated solvent, wherein the polymer is selected from the group consisting of polyethylene, polypropylene, and polybutylene;
   cooling the solvent-polymer mix to form a polymer fibril structure;
   exchanging the first solvent for a second solvent, wherein the second solvent has a a lower critical temperature than the first solvent, wherein the second solvent is selected from the group consisting of liquid carbon dioxide, methane, ethane, propane and ethylene; and
   removing the second solvent from the polymer fibril structure, wherein the removing step comprises critical point drying, thereby forming a nanoporous wick having a pore size of less than 50 nanometers (nm) and a porosity between 90% and 98%, and the nanoporous wick suitable for performing one or more of containing and transferring one or more of water, ammonia, Freon, hydrogen, nitrogen, and methane.

4. A method of forming a nanoporous wick, comprising the steps of:
   heating a first solvent, wherein the first solvent is selected from the group consisting of toluene, xylene, benzene, trichloroethane, trichlorobenzene, decalin and mixtures thereof;
   dissolving a polymer in the heated solvent, wherein the polymer is selected from the group consisting of polyethylene, polypropylene, and polybutylene;
   cooling the solvent-polymer mix to form a polymer fibril structure;
   exchanging the first solvent for a second solvent, wherein the second solvent has a a surface tension less than 20 mN/m, and wherein the second solvent is selected from the group consisting of perfluorohexane, perfluoroheptane, perfluorooctane, hexafluorobenzene, diethyl ether, dipropyl ether, diisopropyl ether and dibutyl ether; and
   removing the second solvent from the polymer fibril structure, wherein the removing step comprises evaporative drying, thereby forming a nanoporous wick having a pore size of less than 50 nanometers (nm) and a porosity between 90% and 98%, and the naoporous wick suitable for performing one or more of containing and transferring one or more of water, ammonia, Freon, hydrogen, nitrogen, and methane.

\* \* \* \* \*